(12) United States Patent
Järvenkylä

(10) Patent No.: US 6,959,736 B2
(45) Date of Patent: Nov. 1, 2005

(54) MULTILAYER PIPE AND METHOD FOR MANUFACTURING ONE

(75) Inventor: Jyri Järvenkylä, Hollola (FI)

(73) Assignee: Uponor Innovation AB, Fristad (SE)

( * ) Notice: Subject to any disclaimer, the term of this patent is extended or adjusted under 35 U.S.C. 154(b) by 148 days.

(21) Appl. No.: 10/164,281

(22) Filed: Jun. 6, 2002

(65) Prior Publication Data

US 2002/0189697 A1 Dec. 19, 2002

(30) Foreign Application Priority Data

Jun. 6, 2001 (FI) .............................. 20011202

(51) Int. Cl.$^7$ ............................... F16L 11/00
(52) U.S. Cl. ................... 138/146; 138/138; 138/143; 138/127; 138/153; 428/36.91; 428/920; 428/921; 169/54
(58) Field of Search .................... 138/137, 138, 138/143, 127, 146, 153; 428/36.91, 920, 921; 169/48, 54, 56; 252/8.05

(56) References Cited

U.S. PATENT DOCUMENTS

| | | | |
|---|---|---|---|
| 4,012,343 A | * 3/1977 | Raley, Jr. ................... 521/143 |
| 4,247,667 A | * 1/1981 | Nojiri et al. ................. 525/254 |
| 4,543,281 A | * 9/1985 | Pedersen et al. ............. 138/148 |
| 4,559,973 A | * 12/1985 | Hane et al. .................. 138/138 |
| 4,636,528 A | * 1/1987 | Kamens et al. ............... 521/95 |
| 4,788,090 A | 11/1988 | Marks et al. ................ 428/34.5 |
| 4,942,903 A | 7/1990 | Jacobsen ..................... 138/110 |
| 5,051,285 A | * 9/1991 | Borzakian .................... 428/36.4 |
| 5,298,068 A | * 3/1994 | Giesemann ................... 106/604 |
| 5,387,386 A | 2/1995 | Kirjavainen ................. 264/173 |
| 5,552,185 A | 9/1996 | De Keyser ................... 427/358 |
| 5,671,780 A | 9/1997 | Kertesz ....................... 138/127 |
| 5,799,705 A | 9/1998 | Friedrich et al. ............ 138/144 |
| 5,925,457 A | * 7/1999 | McGinniss et al. .......... 428/341 |
| 5,985,385 A | * 11/1999 | Gottfried .................... 428/34.6 |
| 6,403,180 B1 | * 6/2002 | Barrall ....................... 428/36.5 |
| 6,546,963 B2 | * 4/2003 | Nuss .......................... 138/141 |
| 6,604,552 B2 | * 8/2003 | Hansen et al. ............... 138/143 |
| 6,742,545 B2 | * 6/2004 | Fisher et al. ................. 138/137 |

FOREIGN PATENT DOCUMENTS

| | | |
|---|---|---|
| DE | 39 42 354 A1 | 6/1991 |
| DE | 195 04 613 A1 | 8/1996 |
| FI | 83184 | 2/1991 |

* cited by examiner

*Primary Examiner*—James Hook
(74) *Attorney, Agent, or Firm*—Fish & Richardson P.C.

(57) ABSTRACT

A multilayer pipe which comprises at least an inner layer and an outer layer. The inner layer is made of extrudable plastic, such as polyethylene PE, cross-linked polyethylene PEX or polypropylene PP. The outer layer forms a fire-protecting layer and the matrix plastic of the outer layer is also made of extrudable plastic. A foaming agent, which does not react during the manufacture of the pipe, is mixed with the matrix. Further, the outer layer contains at least one additive in such a manner that the outer layer has a pipe-reinforcing component and a fire-retardant component. Most preferably, at least the outer layer is extruded by an extruder having a screw length ratio of less than 10 to its biggest diameter.

8 Claims, 1 Drawing Sheet

MULTILAYER PIPE AND METHOD FOR MANUFACTURING ONE

Figure 1:
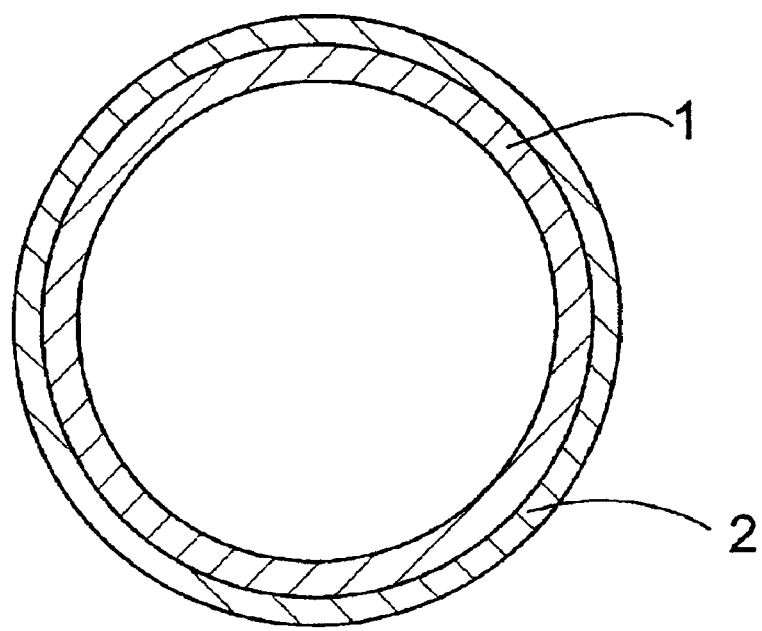

Pursuant to 35 USC §119, this application claims the benefit of Finland Patent Application No. 20011202 filed Jun. 6, 2001.

The invention relates to a multilayer pipe which comprises at least an inner layer and an outer layer, the inner layer being made of extrudable plastic, the matrix plastic of the outer layer being made of extrudable plastic and the outer layer being arranged to be a fire-protection layer.

The invention further relates to a method for manufacturing a multilayer pipe.

Fire-retardant or fire-resistant properties are required in pipes which are, for instance, used as sprinkler pipes, gas pipes inside buildings, discharge pipes of vehicles and pneumatic and hydraulic pipes in mechanical engineering. U.S. Pat. No. 5,671,780 discloses a multilayer flexible conduit having an outer layer of halogen-free and phosphorus-free thermoplastic material. The intermediate layer contains fire-resistant fibers or textile, and the inner layer is a diffusion-tight layer of a thermoplastic material. U.S. Pat. No. 4,942,903 discloses a plastic pipe having an innermost layer of polymeric plastic. Heat insulation is arranged outside the innermost layer and outside the heat insulation, there is a fire-resistant layer which at a high temperature forms a ceramic stable fire-protecting phase. U.S. Pat. No. 5,799,705 discloses a structural pipe around which one or more fire-protecting layers are arranged, the layers comprising fiber-reinforced resin layers. U.S. Pat. No. 4,788,090 discloses a plastic pipe coated on the outer surface with a thermal insulation comprising foam. Outside the thermal insulation, there is an outer layer containing fibers. In a fire, the fibers fuse together increasing the mechanical strength of the foam layer. A weakness in the solutions presented above is, among other things, that the manufacture of such pipes is quite difficult. Further, to ensure adequate fire-protection properties the pipes must be made quite thick. Adding fire-protection agents to the pipe materials also decreases the mechanical strength of the pipes.

U.S. Pat. No. 5,552,185 discloses plastic articles, such as pipes, equipped with fire enduring properties. The article comprises a core layer which is made of a polymeric plastic material, and said core layer is coated with a fire-resistant material. The fire-resistant layer is made up of a thermoplastic material and a char-forming material and an intumescent material. In a fire, the fire-resistant layer forms char and bubbles on top of the core layer. This type of article is quite difficult to manufacture and the mechanical strength properties of the article may require that the wall becomes quite thick.

DE publication 19 504 613 discloses a five-layer pipe having a foam layer as the second-outermost layer which contains a foaming agent which does not react during the manufacture of the pipe. When the pipe is exposed to heat, the foam layer produces foam. To make the pipe mechanically strong enough, it must have several layers, such as an outermost layer outside the foam layer. This is why the pipe structure is very complex and the pipe difficult and expensive to make. Further, halogen plastics are used in the pipe, which in a fire form dangerous compounds.

It is an object of the present invention to provide a new type of fire-enduring multilayer pipe.

The pipe of the invention is characterized in that the outer layer contains a non-reacted foaming agent and at least one additive in such a manner that the outer layer has a fire-retardant component and a pipe-reinforcing component.

Further, the method of the invention is characterized in that the outer layer of the pipe contains a halogen-free fire-protecting agent and that at least the outer layer is extruded by an extruder having a screw length ratio of less than 10 to its biggest diameter.

An essential idea of the invention is that the multilayer pipe comprises at least an inner layer and an outer layer, the inner layer being made of extrudable plastic, typically polyolefins, such as polyethylene PE, cross-linked polyethylene PEX or polypropylene PP. The outer layer forms a fire-protecting layer for the inner layer and the matrix plastic of the outer layer is also made of extrudable plastic. A foaming agent, such as azodicarbonamide which does not react during the manufacture of the pipe, is mixed with the matrix. Further, the outer layer contains at least one additive in such a manner that the outer layer has a pipe-reinforcing component and a fire-retardant component. The fire-retardant component can be an inorganic filler, such as aluminum trihydrate ATH, vermiculite, silicate, phosphate or carbonate, or another corresponding halogen-free fire-protecting agent. The fire-retardant additive can, at the same time, serve as a reinforcing component, in which case said additive can be a fire-resistant inorganic material, such as short-cut fiberglass or ceramic whiskers fiber. The reinforcing component can also be a separate additive, in which case it can, for instance, be an inorganic fiber or a mixture of inorganic or organic fibers or reinforcing needle- or flake-shaped minerals. When exposed to fire, the foaming agent, which did not react during the manufacture of the plastic pipe, reacts and produces foam that makes the outer layer thicker, thus making the layer at said foamed location serve as a very good insulation. Due to the reinforcing component, the mechanical strength of the foamed layer also remains quite good.

The invention provides the advantage that the outer layer which protects the pipe against fire can be quite thin. Because the outer layer has a pipe-reinforcing component, the pipe is as a whole quite mechanically strong.

Figure 2:
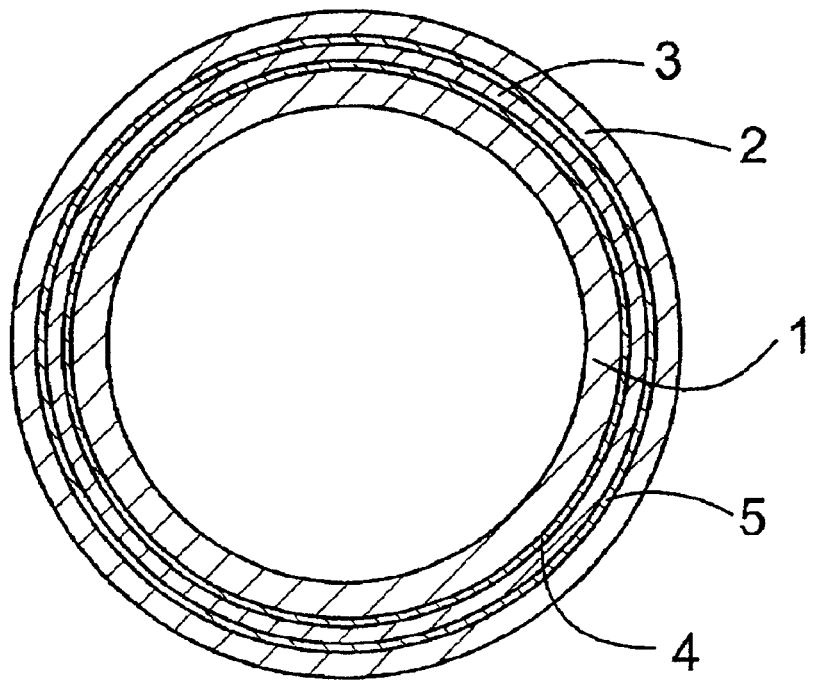

The invention is described in greater detail in the accompanying drawings, in which FIG. 1 is a schematic cross-sectional view of a pipe of the invention, and FIG. 2 is a schematic cross-sectional view of another pipe of the invention.

FIG. 1 shows a multilayer pipe having an inner layer 1 and an outer layer 2. The inner layer 1 is made of extrudable plastic. The material of the inner layer 1 can be a polyolefin, such as polyethylene PE, cross-linked polyethylene PEX or polypropylene PP. The inner layer 1 can also be made of another material, such as polyamide PA or acrylonitrile butadiene-styrene ABS. Mixtures of different materials can also be used.

The matrix plastic of the outer layer 2 can be any extrudable plastic or plastic mixture. The basic material of the outer layer 2 can be a polyolefin or ethylene vinyl acetate EVA, for instance.

A foaming agent, which does not react during the manufacture of the pipe, is mixed with the matrix of the outer layer 2, and the outer layer 2 thus contains a non-reacted foaming agent. The foaming agent can, for instance, be an azodicarbonamide or the like. The outer layer 2 also contains an additive in such a manner that the outer layer 2 has a fire-retardant component and a pipe-reinforcing component. This additive can, for instance, be short-cut fiberglass or ceramic whiskers fibers, which at the same time serve as a fire-retardant component and a pipe-reinforcing component. This type of non-flammable inorganic agent makes it possible for the outer layer to expand when the foaming agent reacts in heat, but the additive keeps the outer layer 2 structurally strong, however. The foaming agent thus reacts at a temperature higher than the extrusion temperature. The additive thus at the same time serves as a fire-retardant component and increases the oxygen index of the outer layer 2.

The outer layer 2 can also contain inorganic fillers. Several halogen-free fire-protecting agents, such as aluminum trihydrate ATH, vermiculite, silicate, phosphate or carbonate which increase the oxygen index of the outer layer, can be used as fillers. The oxygen index of the outer layer is preferably increased to over 30. Magnesium hydroxide, halogenated fire-protecting agents often together with antimony oxide or phosphor-containing fire-protecting agents can also be mixed to the outer layer 2. Carbon and/or carbonaceous agents can also be used as additives, and they can be quite small in size, in the nanometer-range, for instance.

The outer layer can be reinforced with inorganic fibers or a mixture of inorganic and organic fibers, for instance. Needle- or flake-like minerals, such as fiberglass, ceramic whiskers fibers or Mica, can also be used as the reinforcing additive.

If desired, the outer layer 2 can also contain an UV stabilizer or thermal stabilizer. The pipe can also have adhesive agents in the layers or between the layers to improve the adhesion of the outer and inner layers to each other. Coloring agents and/or light-reflecting pigments, such as metal particles, can also be added to the outer layer.

The outer layer 2 can be extruded in such a manner that it can easily be peeled off from the inner layer 1, as disclosed in U.S. Pat. No. 579,461. It is then easy and simple to attach the pipe by electro-welding or some other attaching system.

FIG. 2 shows a pipe, in which an intermediate layer 3 is arranged between the inner layer 1 and the outer layer 2. The intermediate layer 3 is a metal layer which is made of thin aluminum, for instance, and which can serve as a barrier layer. An inner adhesion layer 4 is arranged between the inner layer 1 and the intermediate layer 3. Correspondingly, an outer adhesion layer 5 can be arranged between the outer layer and the intermediate layer 3. The adhesion layers 4 and 5 can be made of an adhesion material available by the trade name Surlyn. The thickness of the inner layer is typically approximately 1 to 10 mm, for instance, the thickness of the intermediate layer is approximately 0.1 to 3 mm, and the thickness of the outer layer 2 serving as the fire-protecting layer is approximately 0.2 to 5 mm. The adhesion layers 4 and 5 are less than 0.1 mm thick. The total diameter of the pipe then varies between 10 and 100 mm. The outer adhesion layer 5, for instance, can be left out, if the outer layer 2 is made of a copolymer plastic which has modified end groups for improving adhesion to the underlying metal intermediate layer 3.

The metal intermediate layer 3 reinforces the mechanical structure of the pipe, but at the same time the intermediate layer 3 spreads the thermal load to a wider area owing to its good thermal conductivity. The heat of a local point-heating flame then does not affect the inner layer 1 at one point, but the heat is distributed to a wider area owing to the thermal conductivity of the intermediate layer 3.

The total thickness of a pipe of the invention can be the same as that of a solid-wall non-fire-protected pipe used for a corresponding purpose, because the possible metal intermediate layer 3 and the reinforcing agent in the outer layer strengthen the pipe. Alternatively, the total thickness of a pipe of the invention can be bigger than that of the above-mentioned non-fire-protected pipe, in which case the peelability of the pipe is preferably utilized in such a manner that the outer layer 2, and possibly the metal intermediate layer 3, too, are peeled away before the pipe is attached to a mechanical crimp connection, for instance.

A multilayer pipe of the invention can be extruded in one phase using several extruders and a multilayer cross-head die. The multilayer pipe can also be extruded using a cone-shaped multilayer extruder described in U.S. Pat. No. 5,387,386, for instance. The use of such a conical extruder, having a rotor, i.e. extruder screw, length ratio of less than 10 to its biggest diameter, is very advantageous, because the fire-protecting materials used in the fire-protecting layer are often very sensitive to shear forces and the shear forces exerted to the material in a conical extruder are very small. In addition, the dwell time of the material in a conical extruder is quite short. A very significant advantage is also achieved by the fact that the outer-layer fibers can, in a conical extruder, be oriented to an angle differing from the axial direction. It is also possible to make the inner layer(s) first and extrude the fire-protecting layer outermost on the pipe using a conventional coating technology.

If the innermost layer is made of cross-linked polyethylene PEX, it can preferably be cross-linked separately before coating. The cross-linking can also be done when all layers of the pipe are on top of each other, by using infra-red technology or later on in a separate heating unit. Cross-linked polyethylene can be of any type, i.e. PEX-a, PEX-b or PEX-c. Just the cross-linking method varies in that PEX-a is cross-linked by utilizing heat, PEX-b is cross-linked by moisture and PEX-c by radiation. The inner layer 1 should preferably be made of cross-linked polyethylene PEX, because this material is highly heat enduring. Further, due to cross-linking said material will not easily creep even at high temperatures.

The drawings and the related description are only intended to illustrate the idea of the invention. The invention may vary in detail within the scope of the claims. A multilayer pipe of the invention can be used as a sprinkler pipe, gas pipe inside buildings, pressure or discharge pipe of vehicles and pneumatic and hydraulic pipe in mechanical engineering. The pipe of the invention can also be used as a protective pipe for optic or other cables. If desired, it is possible to make one or more layers outside the outer layer serving as the fire-protecting layer.

What is claimed is:

1. A multilayer pipe which comprises at least an inner layer and an outer layer, the inner layer being made of extrudable plastic, the matrix plastic of the outer layer being made of extrudable plastic, the outer layer being arranged to be a fire-protection layer and the outer layer containing a non-reacted foaming agent such that when the vine is exposed to fire, the foaming agent reacts to convert the outer layer to a foamed layer, and the outer layer also containing at least one additive in such a manner that the outer layer has a fire-retardant component and a pipe-reinforcing component.

2. A pipe as claimed in claim 1, wherein the outer layer contains short-cut fibers and/or ceramic whiskers fibers.

3. A pipe as claimed in claim 1, wherein the outer layer contains a halogen-free fire-protecting agent.

4. A pipe as claimed in claim 1, wherein the inner layer is made of cross-linked polyethylene PEX.

5. A pipe as claimed in claim 1, wherein the foaming agent is azodicarbonamide.

6. A pipe as claimed in claim 1, wherein between the outer layer and the inner layer there is an intermediate layer, the heat-conductivity of which is higher than that of the inner layer.

7. A pipe as claimed in claim 6, wherein the intermediate layer is made of metal.

8. A pipe as claimed in claim 7, wherein the intermediate layer is made of aluminum.

* * * * *